United States Patent
Ihara et al.

(10) Patent No.: US 6,969,459 B2
(45) Date of Patent: Nov. 29, 2005

(54) PROCESSING APPARATUS AND AN OPERATING METHOD THEREOF

(75) Inventors: Susumu Ihara, Hiroshima-Ken (JP); Katsuji Nakanishi, Hiroshima-Ken (JP); Tsugumaru Yamashita, Hiroshima-Ken (JP)

(73) Assignee: Mazda Motor Corporation, Hiroshima-ken (JP)

( * ) Notice: Subject to any disclaimer, the term of this patent is extended or adjusted under 35 U.S.C. 154(b) by 249 days.

(21) Appl. No.: 10/259,807

(22) Filed: Sep. 30, 2002

(65) Prior Publication Data

US 2003/0085077 A1 May 8, 2003

(30) Foreign Application Priority Data

Oct. 1, 2001 (JP) .......................... 2001-305090

(51) Int. Cl.⁷ .............................................. B01D 36/04
(52) U.S. Cl. ...................... 210/96.1; 210/121; 210/168; 210/171; 210/257.1; 210/259; 210/513
(58) Field of Search ................................ 210/96.1, 121, 210/168, 171, 259, 260, 262, 513, 257.1; 408/56, 57, 61; 409/137; 82/901; 184/6.24; 494/901

(56) References Cited

U.S. PATENT DOCUMENTS 3,265,212 A * 8/1966 Bonsall, Jr. ................. 210/787

4,740,323 A    4/1988  Suzuki et al.
6,318,219 B1   11/2001 Kato
6,322,694 B1 * 11/2001 Iliadis et al. ................. 210/167
6,508,944 B1 *  1/2003 Bratten ......................... 210/805

FOREIGN PATENT DOCUMENTS

JP          07-80111       8/1995
JP          11-77483       3/1999

* cited by examiner

*Primary Examiner*—Matthew O. Savage
(74) *Attorney, Agent, or Firm*—Nixon Peabody LLP; Donald R. Studebaker

(57) ABSTRACT

A processing apparatus and an operating method of the processing apparatus, in which a water insoluble oil homogeneous to a water insoluble oil (processing oil) used for a mist-lubrication in a processing site on a work is used as a lubricating oil for a lubrication section of a processing machine, an aqueous solution is used as a cleaning liquid for cleaning the work after having been processed, and then a used processing oil and a used cleaning liquid are recovered and separated and further the separated processing oil and cleaning liquid are circulated into respective supply means, so that the used processing oil may be recovered and reused even if the lubricating oil is mixed into the processing oil since both are homogeneous oil and further the used cleaning liquid and the used processing oil can be surely separated from each other and reused, which allows to reduce an amount of waste as well as to reduce the cost.

9 Claims, 6 Drawing Sheets

PROCESSING APPARATUS AND AN OPERATING METHOD THEREOF

FIELD OF THE INVENTION

The present invention relates to a processing apparatus in which a water insoluble oil is supplied in the form of mist to a processing site on a work as a processing oil while processing the work by a tool, and also to an operating method of said apparatus.

PRIOR ART

Recently, in place of lubrication in a processing site on a work by a conventional water soluble coolant, such a system has been developed in which a biodegradable oil formed into a mist is used to lubricate the processing site on the work.

Although the above-described biodegradable oil has great advantages that there is no fear of negative effect on the environment because it would be decomposed into carbide such as $CO_2$ and the water, and that the mist-lubrication allows to save the energy, there has been a problem that the biodegradable oil (water insoluble oil) itself is rather expensive.

In order to solve the problem described above, the water insoluble oil having used for mist-lubrication should be recovered and reused, but in this case there is another problem that since it is difficult to remove the chips adhering to the work and its periphery during processing with the tool, by the water insoluble oil for the mist-lubrication as described above, the work having being processed must have been leaned by a cleaning liquid separately.

In addition, since a main shaft of the processing apparatus is lubricated by a lubricating oil which is easy to leak out, and this results in inevitable mixing of the water insoluble oil for the mist-lubrication, the cleaning liquid for cleaning the work and the lubricating oil for the main shaft all together, there is yet another problem that it is difficult to separate them to reuse.

On the other hand, the Japanese Patent Publication No. H7-80111 has disclosed a lubricating method for a machine tool in which while using the lubricating oil for lubricating a main shaft and a sliding surface of a processing machine, a diluted lubrication oil diluted by a diluent such as water is used for lubricating a processing cite thereby preventing a possible trouble in lubrication even if both being mixed with each other, but this conventional method has not disclosed the method for recovering, separating and reusing the lubricating oil and the diluent.

Further, the Japanese Patent Laid-open Publication No. H11-77483 has disclosed a cutting processing method in which upon processing a work by using a water insoluble cutting oil, an aqueous solution is sprayed or injected toward a processing site on the work, wherein used liquid is recovered and stored in a recovery tank and the water insoluble cutting oil and the aqueous solution are separated from each other based on a difference in the specific gravity therebetween so as to be reused respectively, but this method is provided for cooling the processing site on the work by the above-described aqueous solution to compensate an insufficient cooling capacity of the water insoluble cutting oil on the work thereby preventing disaster.

Since an effect of the mist-lubrication is obstructed if the above-mentioned aqueous solution is supplied to the processing site on the work, it is impossible to apply this system to the processing apparatus and the processing method in which the lubrication oil in the form of mist is supplied to the processing site on the work while processing the work with the tool.

PROBLEMS TO BE SOLVED BY THE PRESENT INVENTION

Accordingly, an object of the present invention is to provide a processing apparatus and an operating method of the processing apparatus, in which a water insoluble oil homogeneous to a water insoluble oil (processing oil) used for a mist-lubrication in a processing site on a work is used as a lubricating oil for a lubrication section of a processing machine, an aqueous solution is used as a cleaning liquid for cleaning the work after having been processed, and then a used processing oil and a used cleaning liquid are recovered and separated and further the separated processing oil and cleaning liquid are circulated into respective supply means, so that the used processing oil may be recovered and reused even if the lubricating oil is mixed into the processing oil since both are homogeneous oil and further the used cleaning liquid and the used processing oil can be surely separated from each other and reused, which allows to reduce an amount of waste as well as to reduce the cost.

MEANS TO SOLVE THE PROBLEMS

The present invention provides a processing apparatus comprising a processing machine equipped with a tool for processing a work, and a processing oil supply means for supplying a water insoluble oil in a form of mist to a processing site on the work as a processing oil, in which a used processing oil is recovered and supplied to said processing oil supply means, wherein said apparatus further comprises a lubricating oil supply means for supplying a water insoluble oil homogeneous to the processing oil to a lubrication section of the processing machine as a lubricating oil, a cleaning liquid supply means for supplying a water soluble cleaning liquid to the work after having been processed, a recovery means for recovering a used processing oil and a used cleaning liquid, a separation means for separating the recovered processing oil and cleaning liquid into the processing oil and the cleaning liquid, a first circulation means for circulating the separated processing oil into the processing oil supply means, and a second circulation means for circulating the separated leaning liquid into the cleaning liquid supply means.

As the water insoluble oil in the above configuration, CHO (synthetic ester oil) having a specific gravity of 0.92 may be employed, and if necessary, an additive (an oxidation inhibitor) such as phenol may be added thereto so as to increase the coefficient of kinematic viscosity. As for the water soluble cleaning liquid, an aqueous solution containing 2% of COOH (anionic carboxylic acid) having a specific gravity of 0.96 may be employed. Both CHO and COOH described above are biodegradable and in addition, COOH has a cleaning function.

According to the above configuration, upon processing the work by the tool, the processing oil supply means supplies the water insoluble oil in the form of mist to the processing site on the work as the processing oil to accomplish the mist-lubrication, the lubricating oil supply means supplies the water insoluble oil homogeneous to the processing oil to the lubrication section of the processing machine (see main shaft and/or slidably moving section) as the lubricating oil, the cleaning liquid supply means supplies the water soluble cleaning liquid to the work after having been processed, the recovery means recovers the used processing oil and the used cleaning liquid, the separation means separates the recovered processing oil and cleaning liquid into the processing oil and the cleaning liquid, the first circulation means circulates the separated processing oil into the processing oil supply means, and the second circulation means circulates the separated cleaning liquid into the cleaning liquid supply means.

Since the water insoluble oil homogeneous to the processing oil used for the mist-lubrication of the processing site on the work is used as a lubricating oil for the lubrication section of the processing machine, the processing oil could be recovered and reused even if the lubricating oil were mixed into the processing oil because of the homogeneous properties of both oils.

Further, it is ensured that the water soluble cleaning liquid and the water insoluble processing oil are separated from each other by using the difference in specific gravity therebetween and accordingly made available for reuse.

Therefore, the amount of waste can be reduced and at the same time, the cost reduction can be expected.

In an embodiment of the present invention, the processing machine described above is equipped with a hydraulic actuator which is operated by using a water insoluble oil homogeneous to the processing oil as a hydraulic operating oil.

According to the above-described configuration, since the hydraulic operation oil for operating the hydraulic actuator is determined to use the water insoluble oil homogeneous to the processing oil, the processing oil can be recovered and reused even if the hydraulic operating oil is mixed into the processing oil, because of the homogeneous properties of both oils.

In another embodiment of the present invention, the present apparatus further comprises a reservoir means for storing the water insoluble oil and a distribution/supply means for distributing and supplying the water insoluble oil from said reservoir means to a supply section of the processing oil supply means and a supply section of the lubricating oil supply means.

According to the above configuration, since the water insoluble oil is distributed and supplied from the single reservoir means to respective supply sections of the processing oil supply means and the lubricating oil supply means, the apparatus can be made simple.

In still another embodiment of the present invention, said recovery means comprises a recovery tank for recovering the used processing oil and the used cleaning liquid, said separation means comprises a centrifugal separator, and a detection means is provided for detecting a quantity of the processing oil in the recovery tank, so that when an output from said detection means indicates that a quantity of the processing oil reached the predetermined level, the centrifugal separator may be actuated.

The detection means in the above configuration may be configured by a float switch and/or a level sensor.

According to the above configuration, since the detection means detects that the quantity of the processing oil in the recovery tank has reached the predetermined level, and based on the detected result of the detection means, the, centrifugal separator may be actuated only when the need arises, therefore it can help save the power.

In still another embodiment of the present invention, a chip removing means for removing chips mixed in the used processing oil and the used cleaning liquid is provided upstream to said recovery tank.

According to the above configuration, since the chip removing means removes chips at an upstream side of the recovery tank, a separating operation in the recovery tank based on a difference in specific gravity may be performed stably.

In still another embodiment of the present invention, a plurality of above-described processing machine is provided, and the cleaning liquid supply means comprises a single cleaning liquid reservoir means for storing the recovered cleaning liquid, a reservoir type intermittent discharge means which is disposed above a processing station of each processing machine to store the cleaning liquid and to intermittently supply the cleaning liquid to the work, and a delivery means for supplying the cleaning liquid from said single cleaning liquid reservoir means to the reservoir type intermittent discharge means.

According to the above configuration, since the cleaning liquid can be supplied almost always from the single cleaning liquid reservoir means to the reservoir type intermittent discharge means by the delivery means, the delivery means can be made to be of small capacity.

In addition, since the reservoir type intermittent discharge means disposed above the processing station allows the cleaning liquid to flow down in dependence on the potential energy, an energy saving can be achieved and at the same time, a sufficient quantity of intermittent discharge volume can be secured, which is effective in cooling and cleaning the work as well as removing the chips.

In still another embodiment of the present invention, said cleaning liquid reservoir means comprises a concentration detecting means for detecting a concentration of the water soluble cleaning liquid, and a concentration adjusting means for adjusting the concentration of the cleaning liquid to fall within a predetermined range based on an output from said concentration detecting means.

In adjusting the concentration described above, a mixing rate of a stock solution of the cleaning liquid to the water may be adjusted.

According to the above configuration, since the concentration of the cleaning liquid is adjusted to fall within a predetermined range by the concentration adjusting means, a cleaning capacity provided by the cleaning liquid can be maintained in an expected level and at the same time, an improved separating property provided by the separation means during separating operation can be established without any trouble.

The present invention also provide an operating method of a processing apparatus for operating the processing apparatus comprising a processing machine equipped with a tool for processing a work, and a processing oil supply means for supplying a water insoluble oil in a form of mist to a processing site on the work as a processing oil, in which a used processing oil is recovered and supplied to said processing oil supply means, said method comprising the steps of a lubricating oil supply step for supplying a water insoluble oil homogeneous to the processing oil to a lubrication section of the processing machine as a lubricating oil, a cleaning liquid supply step for supplying a water soluble cleaning liquid to the work after having been processed, a recovery step for recovering the used processing oil and a used cleaning liquid, a separation step for separating the recovered processing oil and cleaning liquid into the processing oil and the cleaning liquid, a first circulation step for circulating the separated processing oil to the processing oil supply means, and a second circulation step for circulating the separated cleaning liquid to a cleaning liquid supply section.

According to the above configuration, when the work is processed by the tool, the processing oil supply means supplies the water insoluble oil in the form of mist to the processing site on the work as the processing oil so as to provide a mist-lubrication; in the lubricating oil supply step, the water insoluble oil homogeneous to the processing oil is supplied to the lubrication section of the processing machine as the lubricating oil; in the cleaning liquid supply step, the water soluble cleaning liquid is supplied to the work after having been processed so as to cool and clean the work; in the recovery step, the used processing oil and the used cleaning liquid are recovered; in the separation step, the recovered processing oil and cleaning liquid is separated into the processing oil and the cleaning liquid; in the first circulation step, the separated processing oil is circulated to the processing oil supply means; and in the second circulation step, the separated cleaning liquid is circulated to the cleaning liquid supply section.

It is to be noted that the first circulation step and the second circulation step may be carried out simultaneously or may be carried out separately.

Since in the above method, the water insoluble oil homogeneous to the processing oil used for the mist-lubrication of the processing site on the work is used as the lubricating oil for the lubrication section of the processing machine, therefore even if the lubricating oil were mixed into the processing oil, the processing oil could be recovered and reused because of the homogeneous properties of both oils.

Further, it is ensured that the water soluble cleaning liquid and the water insoluble processing oil are separated from each other by using the difference in specific gravity therebetween and accordingly made available for reuse.

Therefore, the amount of waste can be reduced and at the same time, the cost reduction can be expected.

In one embodiment of the present invention, the processing machine described above is equipped with a hydraulic actuator which is operated by using a water insoluble oil homogeneous to the processing oil as a hydraulic operating oil.

According to the above-described configuration, since the hydraulic operation oil for operating the hydraulic actuator is the water insoluble oil homogeneous to the processing oil, therefore even if the hydraulic operating oil is mixed into the processing oil, the processing oil can be recovered and reused because of the homogeneous properties of both oils.

In another embodiment of the present invention, said water insoluble oil is stored in a reservoir means and the water insoluble oil is distributed and supplied from said reservoir means to a supply section of the processing oil supply means and a supply section for the lubricating oil.

According to the above configuration, since the water insoluble oil is distributed and supplied from the single reservoir means to both the supply section of the processing oil supply means and the supply section for the lubricating oil, the apparatus can be made simple.

In still another embodiment of the present invention, in said recovery step, the used processing oil and the used cleaning liquid are recovered into a recovery tank and in said separation step, the recovered processing oil and cleaning liquid is centrifugally separated into the processing oil and the cleaning liquid by a centrifugal separator, wherein a quantity of the processing oil in said recovery tank is detected by a detection means, and the centrifugal separator is actuated when an output from said detection means indicates that the quantity of the processing oil has reached the predetermined level.

According to the above configuration, since the detection means detects that the quantity of the processing oil in the recovery tank has reached the predetermined level, and based on the detected result of the detection means, the centrifugal separator may be actuated only when a need arises, therefore a power saving may be accomplished.

In still another embodiment of the present invention, a plurality of above-described processing machine is provided, and also a reservoir type intermittent discharge means is provided, which stores the cleaning liquid above a processing station of each processing machine to intermittently supply the cleaning liquid to the work, wherein in the cleaning liquid supply step, the cleaning liquid, which has been separated and recovered into a single cleaning liquid reservoir means and delivered in advance from said single cleaning liquid reservoir means to said reservoir type intermittent discharge means to be stored therein by a delivery means, is supplied to the work after having been processed.

According to the above configuration, since the cleaning liquid can be supplied almost always from the single cleaning liquid reservoir means to the reservoir type intermittent discharge means by the delivery means, the delivery means can be made to be of small capacity.

In addition, since the reservoir type intermittent discharge means disposed above the processing station allows the stored cleaning liquid to flow down in dependence on the potential energy, an energy saving can be achieved and at the same time, a sufficient quantity of intermittent discharge volume can be secured, which is effective in cooling and cleaning the work as well as removing the chips.

In still another embodiment of the present invention, a concentration of the water soluble cleaning liquid is detected by a concentration detecting means installed in said cleaning liquid reservoir means, and the concentration of the cleaning liquid is adjusted based on an output from said concentration detecting means so as to fall within a predetermined range.

According to the above configuration, since the concentration of the cleaning liquid is adjusted based on the output from the concentration detecting means, a cleaning capacity provided by the cleaning liquid can be maintained in an expected level and at the same time, an improved separating property provided by the separation means during separating operation can be established without any trouble.

DESCRIPTION OF THE PREFERRED EMBODIMENTS

A preferred embodiment of the present invention will now be described with reference to the attached drawings.

Figure 1:
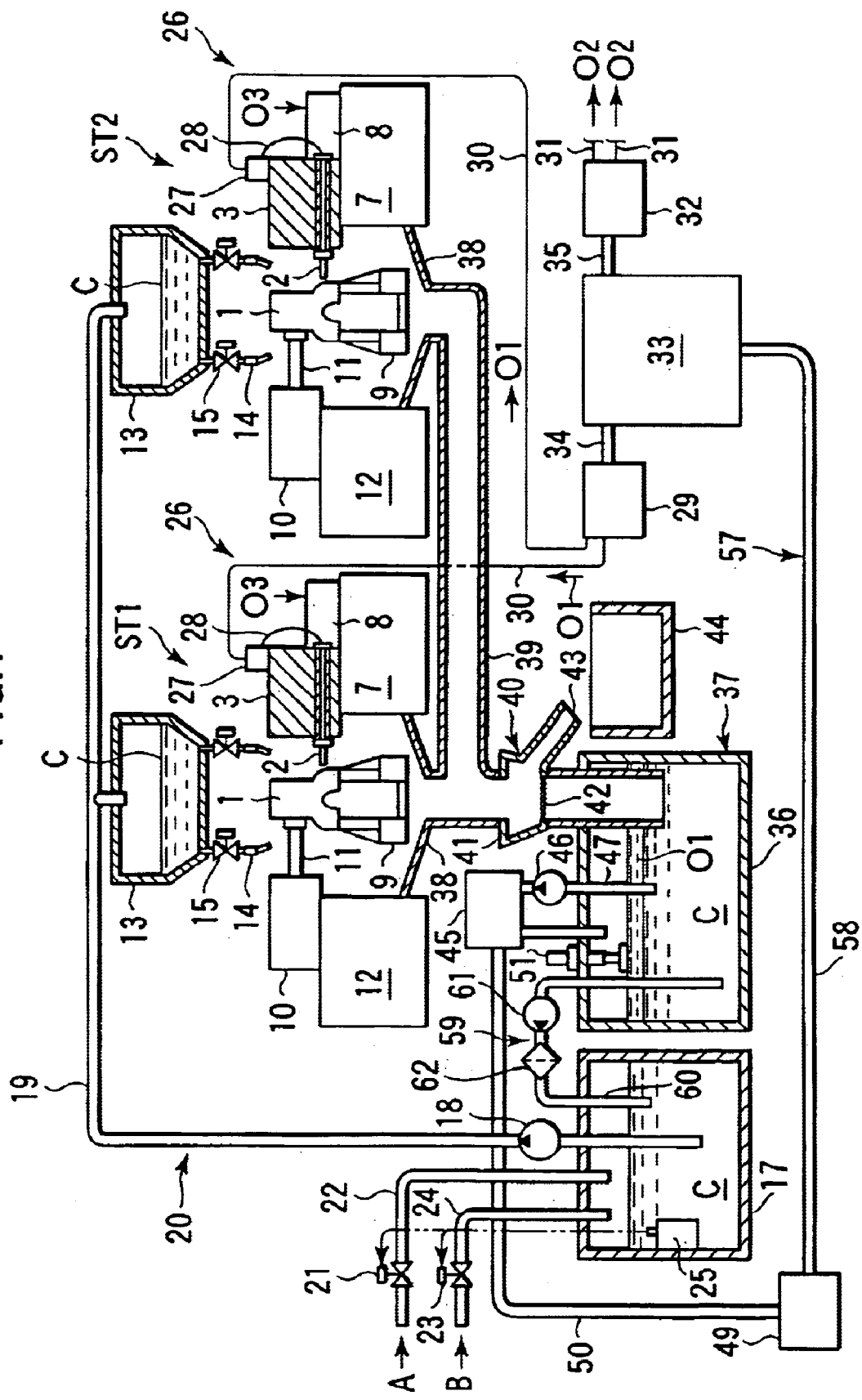
FIG. 1 is a system diagram illustrating a processing apparatus and an operation of said processing apparatus according to the present invention.
Figure 2:
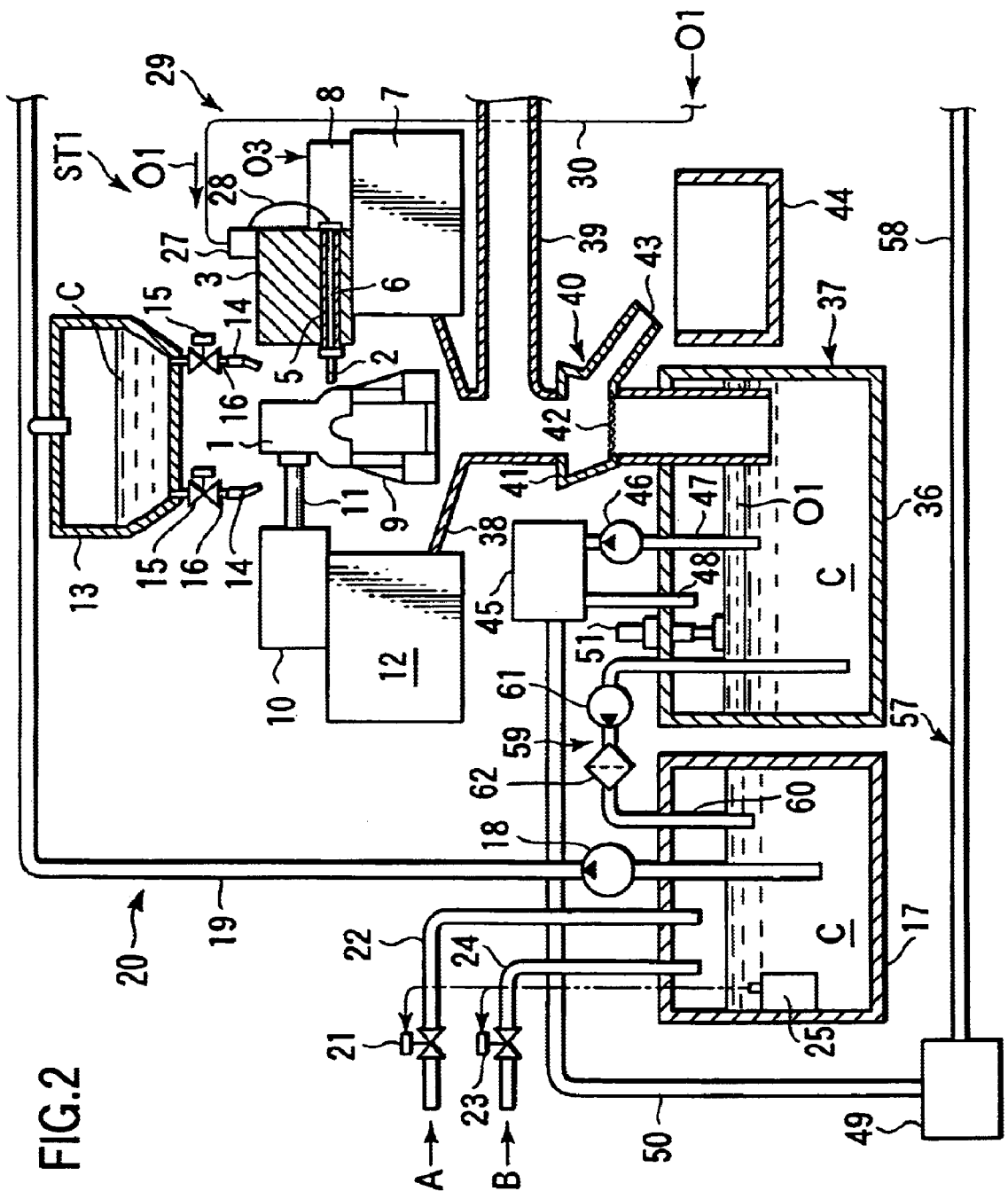
FIG. 2 is apart enlarged view of FIG. 1.

The attached drawings show a processing apparatus and an operation of said processing apparatus, in which FIGS. 1 and 2 specifically show said processing apparatus comprising a processing machine 3 having a tool 2 for processing a work 1 (e.g., a cylinder block). A transfer machine (an automatic sequential processing machine), a machining center, an NC processing machine or the like may be used as said processing machine 3.

Figure 3:
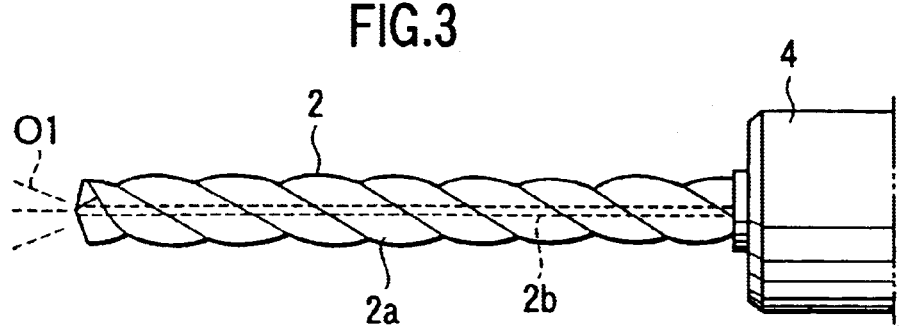
FIG. 3 is a schematic diagram illustrating a tool.

As for the tool 2 described above, for example, such a drill as shown in FIG. 3, which is a cutting tool having helical flutes 2a, may be employed, in which an oil mist bore 2b is formed along an axial center line of the drill, and said drill is detachably mounted to a top end of a main shaft 5 via a holder 4, as shown in FIG. 2. In this regard, the tool 2 may be mounted to the top end of the main shaft 5 by the use of tool chuck method.

The above-described main shaft 5 is operatively supported by the processing machine 3 in such a manner that the main shaft 5 can be driven with high speed of revolution and an oil hole 6 is formed along an axial center line of said main shaft 5.

The above-described processing machine 3 is mounted on a bed 7 and driven by a hydraulic actuator 8.

On the other hand, the above-described work 1 is loaded on a support table 9 and held in its upper and lower portions by a clamping device, though not shown.

A backup equipment 10 is disposed in an opposite side of the processing machine 3 with respect to the work 1 (in the left-hand side on the paper) for backing up the work 1 during the processing by the tool 2.

This backup equipment 10 includes a backup rod 11 and is installed on an upper surface of a bed 12.

As shown in FIG. 1, this processing apparatus includes a plurality of processing stations, ST1, ST2, on which respective elements 1 to 12 as described above are disposed. It is to be noted that only two stations, ST1 and ST2, are shown in the drawing for simplicity, but three or more stations may be provided in the processing apparatus.

In each of the processing stations, ST1 and ST2 described above, a pool tank 13 is located above the works 1 and each of the pool tank 13 is provided in an under side thereof with a cleaning liquid discharge pipe 16 having a nozzle 14 in a lower end and an electromagnetic valve 15 interposed in an intermediate location thereof respectively.

In this regard, a tip of the above-described nozzle 14 is directed to a processing site on the work 1 provided by the tool 2 or a periphery thereof. Further, the pool tank 13 is configured such that it contain inside thereof a cleaning liquid "C", which may be supplied to the work 1, after its having been processed, intermittently by effectively using a potential energy so as to carry out cooling and cleaning of the work 1 thus to remove chips from the work 1. Specifically, a reservoir type intermittent discharge means has been constructed in said pool tank 13.

On the other hand, a single cleaning liquid tank 17 serving as a cleaning liquid reservoir means for storing the cleaning liquid C is disposed in a lower portion of the apparatus, and a fluid delivery pipe 19 having a pump 18 interposed therein is arranged as a delivery means between this cleaning liquid tank 17 and the pool tanks 13 in order to supply the cleaning liquid C from the cleaning liquid tank 17 to respective pool tanks 13 located above.

Those respective elements 13, 17, 18 and 19 as described above all together make up a cleaning liquid supply means 20 for supplying the cleaning liquid C to the work 1 after having been processed.

As the cleaning liquid C is employed a water soluble cleaning liquid of COOH (anionic carboxylic acid) which has been diluted with $H_2O$ (water) to an appropriate concentration.

To make such cleaning liquid, above-described cleaning liquid tank 17 is provided with a water supply pipe 22 having an electromagnetic valve 21 interposed therein and a stock solution supply pipe 24 having an electromagnetic valve 23 interposed therein in which the water "A" is supplied from the water supply pipe 22 into the cleaning liquid tank 17 during the electromagnetic valve 21 being open, while supplying the COOH as the stock solution "B" from the stock solution supply pipe 24 into the cleaning liquid tank 17 during the electromagnetic valve 28 being open.

In this configuration, the above-described cleaning liquid tank 17 is further provided with a concentration sensor 25 serving as a concentration detecting means for detecting a concentration of the cleaning liquid C, and based on an output from this concentration sensor 25, said respective electromagnetic valves 21, 23, serving as a concentration adjusting means, are controlled to be opened or closed so as to adjust the concentration of the cleaning liquid C to fall within a predetermined range. It is to be noted that the above-described electromagnetic valves 21, 23 may be replaced with duty-controlled solenoid operated valves, respectively.

On the other hand, the apparatus is provided with a processing oil supply means 26 for supplying water insoluble oil as a processing oil "O1" in the form of mist toward the processing site on the work 1.

This processing oil supply means 26 comprises a supply section 27 disposed in, the processing machine 3, a line 28 for establishing a communication between said supply section 27 and the oil hole 6 of the main shaft 5, and a processing oil supply pipe 30 (a processing oil supply channel) for establishing a communication between the supply section 27 and a distributing sub tank 29, in which the processing oil O1 can be supplied via the oil hole 6 of the main shaft 5 and the oil mist bore 2b to the processing site on the work 1.

As the above-described water insoluble oil may be employed CHO (a synthetic ester oil) having a specific gravity of 0.92.

A lubricating oil supply pipe 31 (a lubricating oil supply channel) is further provided as a lubricating oil supply means for supplying a water insoluble oil having the same chemical composition as to said processing oil O1 into a lubrication section of the processing machine 3 (see the main shaft or a slideably moving section) as a lubricating oil "O2".

This lubricating oil supply pipe 31 may be provided so as to establish a communication between each lubrication section of the processing machine 3 in each of the processing stations, ST1, ST2 and a distributing sub tank 32.

An automatic oil supply unit 33, also functioning as a reservoir means for storing the water insoluble oil, is arranged in the vicinity of above-stated respective distributing sub tanks 29, 32.

The above-mentioned automatic oil supply unit 33 (the reservoir means) is connected with respective distributing sub tanks 29, 32 via oil delivery lines 34, 35, and said respective distributing sub tank 29, 32 can distribute the water insoluble oil delivered from the automatic oil supply unit 33 to supply sections of the processing oil supply pipes 30, 30 and supply sections of the lubricating oil supply pipes 31, 31 of respective processing stations ST1, ST2. Specifically, in this configuration, above-discussed distributing sub tanks 29, 32 construct distribution/supply means, respectively.

Further, above-mentioned hydraulic actuator 8 is supplied with water insoluble oil having the same chemical composition as to the processing oil O1 as a hydraulic operating oil "O3".

Specifically, in this embodiment, the processing oil O1 used for providing the lubrication in the form of mist, the lubricating oil O2 for lubricating the lubrication section of the main shaft 5 or the like, and the hydraulic operating oil O3 for operating the hydraulic actuator 8 are all designated to be the homogeneous water insoluble oil (e.g., CHO).

It is to be appreciated that an oxidation inhibitor such as phenol (representing a carbolic acid and expressed in the chemical formula $C_6N_6OH$) may be added to said water insoluble oil in order to enhance the coefficient of kinematic viscosity in machine lubrication or in order to ensure a satisfactory function as the hydraulic operating oil.

On the other hand, a recovery means 37 is provided for making a interconnection between a section defined below the support table 9 in each of the stations ST1, ST2 and a recovery tank 36 arranged as a recovery vessel.

This recovery means 37 comprises receiving chutes 38, 38 disposed below the support tables 9, 9, a recovery path 39 for establishing a communication between respective receiving chutes 38, 38 and the recovery tank 36, and said recovery tank 36 so as to recover the used processing oil O1 and the used cleaning liquid C.

A chip separator 40 functioning as a chip removing means for removing chips, dusts and other foreign substances mixed in the used processing oil O1 and the used cleaning liquid C is interposed in the recovery path 39 upstream to said recovery tank 36, specifically, in a location where the recovery path 39 for the processing station ST1 meets with the recovery path 39 for the processing station ST2.

This chip separator 40 comprises a casing 41 having an upper communication section in communication with the recovery path 39 as well as a lower communication section, a net 42 (so called mesh) extending to cover said lower communication section, and a discharge port 43 for discharging the separated chips to the outside of the recovery path, and a chip recovery tank 44 is disposed below said discharge port 43.

On the other hand, in a location above or near to said recovery tank 36, a centrifugal separator 45 is arranged as a separation means for separating the recovered mixture of the used processing oil O1 and the used cleaning liquid C into the oil O1 and the liquid C.

This centrifugal separator 45 comprises a suction pipe 47 having a pump 46 interposed therein and a return pipe 48 for allowing the separated cleaning liquid C to flow back into the recovery tank 36, while said centrifugal separator 45 is connected to a return pipe 50 for allowing the separated processing oil O1 to flow back into the oil recovery tank 49.

It is to be appreciated that the above-described recovery tank 36 carries out the separation between the processing oil O1 and the cleaning liquid C based on the difference in specific gravity between the specific gravity of 0.92 for the processing oil O1 and that (approximately equal to 1.0) for the cleaning liquid C, so that the processing oil O1 can be separated and thus reside above the cleaning liquid C. Accordingly, above-described separation means includes both of the separating function due to the specific gravity in this recovery tank 36 and the positive centrifugal separating function due to the centrifugal separator 45.

The above-described recovery tank 36 is provided with a float sensor 51 as a detection means for detecting a quantity of the processing oil O1 in said recovery tank 36, and in the configuration of the present invention, the centrifugal separator 45 can be actuated when it is determined based on an output from the float sensor 51 that the quantity of the processing oil O1 has reached a predetermined level.

Figure 4:
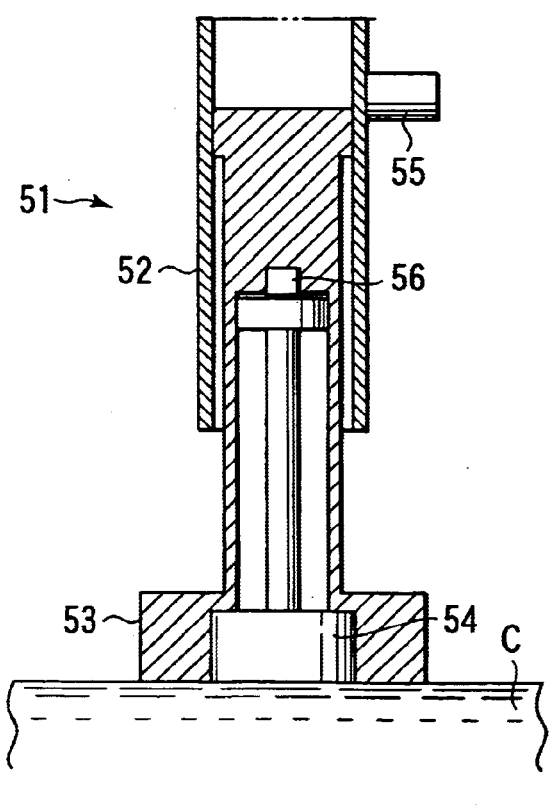
FIG. 4 is a sectional view of a detection means.
Figure 5:
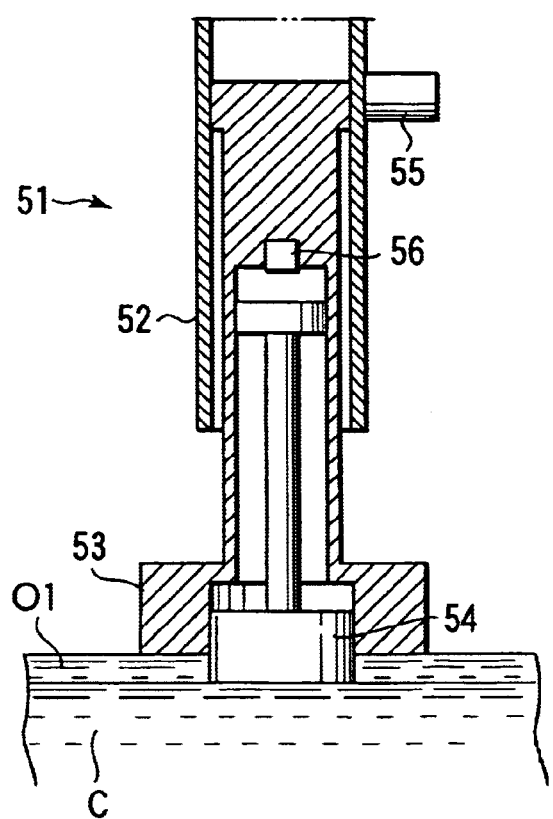
FIG. 5 is a schematic view for illustrating an operation of the detection means.

The above described float sensor 51 has been configured as shown in FIGS. 4 and 5.

Specifically, this float sensor 51 comprises, an outer cylinder 52, an outer float 53 operatively disposed in an inside of said outer cylinder 52 so as to movably follow the liquid of upper layer, an inner float 54 operatively disposed in an inside of said outer float 53 so as to movably follow the liquid of lower layer, a proximity switch 55 for detecting the liquid surface level of the upper layer from an upward or downward displacement of a top portion of the outer float 53, and a detecting section 56 composed of a proximity switch or a distance sensor and so on for detecting the quantity of the processing oil O1 from an upward or downward displacement of the top portion of the inner float 54, independently of the quantity of the cleaning liquid C.

Then, when the condition, as shown in FIG. 4, where no processing oil O1 exists over the liquid surface of the cleaning liquid C is turned to be that, as shown in FIG. 5, where a predetermined quantity of processing oil O1 floats over the liquid surface of the cleaning liquid C, the inner float 54 moves down, and the detecting section 56 detects the processing oil O1 has reached the predetermined level of quantity.

With this configuration, as compared to the configuration according to the prior art employing two of multipoint float sensors, the float sensor 51 of the present invention can be constructed in a simple manner.

On the other hand, as shown in FIGS. 1 and 2, the apparatus is further provided with a first circulation channel 57 serving as a first circulation means for circulating the processing oil O1, after having been separated in the centrifugal separator 45, through the processing oil supply pipe 30 by the use of the automatic oil supply unit 33.

This first circulation channel 57 comprises a return pipe 50 interconnecting the centrifugal separator 45 and the oil recovery tank 49, the above-described oil recovery tank 49, and a return pipe 58 for interconnecting said oil recovery tank 49 and the automatic oil supply unit 33.

In addition, the apparatus is further provided with a second circulation channel 59 serving as a second circulation means for circulating the cleaning liquid C, after having been separated in the centrifugal separator 45, into the cleaning liquid tank 17 serving as the single reservoir means of the cleaning liquid.

Said second circulation channel 59 comprises a return pipe 60 with its suction side disposed within the recovery tank 36 and its discharge side disposed within the cleaning liquid tank 17, and a pump 61 and a filter 62, each interposed in said return pipe 60.

An operating method of thus configured processing apparatus will now be explained below in detail.

Upon driving of the processing machine 3, the lubricating oil O2 is supplied from the automatic oil supply unit 33 to the lubrication section of the processing machine 3 via the distributing sub tank 32 and the lubricating oil supply pipe 31 (lubricating oil supply step).

Further, for the use in the mist lubrication, the processing oil O1 in the form of mist is supplied from the automatic oil supply unit 33 to the specific site on the work 1 to be processed by the tool 2 via the distributing sub tank 29 and the processing oil supply pipe 30 (processing oil supply step).

Further, the water insoluble oil homogeneous to the processing oil O1 and the lubricating oil O2 is supplied as the hydraulic operating oil O3 specifically to the hydraulic actuator 8 (hydraulic operating oil supply step).

It is to be understood that those steps of lubricating oil supply step, processing oil supply step and hydraulic operating oil supply step may be carried out synchronously or with a predetermined time-lag between one step and another, depending on the conditions for processing of the work 1 to be processed.

The pump 18 of the cleaning liquid supply means 20 may be driven during the work 1 being processed by the tool 2 or at fill-time including both the period for the work 1 not being processed and the period for the work 1 being processed, so that the cleaning liquid C within the cleaning liquid tank 17 may be stored in the pool tank 13 in advance via the liquid delivery pipe 19.

Then, after the work 1 having been finished with the processing by the tool 2 in the appropriate station, the electromagnetic valve 15 below the pool tank 13 is controlled to open, and the water soluble cleaning liquid C is supplied to the processed work 1 so as to carry out cooling and washing of the work 1 as well as removing of the chips which has adhered to the processing site or its peripheral region on the work 1 (cleaning liquid supply step).

It is to be noted that said electromagnetic valve 15 may be controlled to close after the cleaning liquid C having been discharged intermittently.

While the above-described used processing oil O1 and cleaning liquid C containing the chips in due course flow down into the recovery tank 36 via the receiving chute 38 and the recovery path 39, the chip separator 40 disposed upstream to said recovery tank 36 may separate the foreign substances, such as chips and dusts, which will be discharged to the chip recovery tank 44 arranged externally to the recovery path 39, so that the used processing oil O1 and the used cleaning liquid C can be recovered into the recovery tank 36 in a state where the chips has been removed therefrom (recovery step).

Within the above-described recovery tank 36, the processing oil O1 is floatingly separated owing to the difference in specific gravity (separated by the specific gravity) on the liquid surface of the cleaning liquid C, and the float sensor 51 detects the quantity of this processing oil O1, and when the output from the float sensor 51 indicates the processing oil O1 having reached the predetermined level of quantity, the centrifugal separator is actuated.

The mixture of two kinds of liquid (see the processing oil O1 and the cleaning liquid C) pumped up through the suction pipe 47 by the action of the above-described centrifugal separator 45 is separated into the processing oil O1 and the cleaning liquid C, and the separated processing oil O1 is discharged into the return pipe 50, while the separated cleaning liquid C flows through the return pipe 48 back into the recovery tank 36 (separation step).

The processing oil O1, which has been separated out by the centrifugal separator 45 and discharged into the return pipe 50, then circulates to the supply section of the processing oil supply means 26 via the oil recovery tank 49, the return pipe 58, the automatic oil supply unit 33, the oil delivery line 34 and the distributing sub tank 29 (first circulation step).

On the other hand, the cleaning liquid C, which has been separated out by the above-described centrifugal separator 45 and flown down into the recovery tank 36 via the return pipe 48, is driven by the pump 61 to circulate to the cleaning liquid tank 17 (cleaning liquid supply section) via the return pipe 60 (second circulation step).

Hereupon, in said cleaning liquid tank 17, the concentration sensor 25 is detecting the concentration of the cleaning liquid C, and if this concentration sensor 25 detects that the concentration of the cleaning liquid C has fallen out of the predetermined range (e.g., the concentration has changed due to the evaporation of the water A contained in the cleaning liquid C or other factors and accordingly the specific gravity of the cleaning liquid C has varied), then the electromagnetic valve 21 or the electromagnetic valve 23 is controlled to be opened, so that the water A may be supplied from the water supply pipe 22 into the cleaning liquid tank 17, or the stock solution B may be supplied from the stock solution supply pipe 24 into the cleaning liquid tank 17, thereby adjusting the concentration of the cleaning liquid C in said tank 17 to fall within the predetermined range.

Thus, the processing apparatus of the embodiment as discussed with reference to FIGS. 1 through 5 designates such a processing apparatus comprising the processing machine 3 equipped with the tool 2 for processing the work 1; and the processing oil supply means 26 for supplying the water insoluble oil in the form of mist to the processing site on the work 1 as the processing oil O1, in which the used processing oil O1 is recovered and then supplied to said processing oil supply means 26, said apparatus further characterized in comprising: the lubricating oil supply means (see the lubricating oil supply pipe 31) for supplying the water insoluble oil homogeneous to the processing oil O1 to the lubrication section of the processing machine 3 as the lubricating oil O2; the cleaning liquid supply means 20 for supplying the water soluble cleaning liquid C to the processed work 1; the recovery means 37 for recovering the used processing oil O1 as well as the used cleaning liquid C; the separation means (see the centrifugal separator 45) for separating the recovered processing oil O1 and cleaning liquid C into the processing oil O1 and the cleaning liquid C; the first circulation means (see the first circulation channel 57) for circulating the separated processing oil O1 into the processing oil supply means 26; and the second circulation means (see the second circulation channel 59) for circulating the separated cleaning liquid C into the cleaning liquid supply means 20.

According to this configuration, during processing of the work 1 by the tool 2, the processing oil supply means 26 supplies the processing site on the work 1 with the water insoluble oil in the form of mist as the processing oil O1 so as to carry out the mist-lubrication; the lubricating oil supply means (see the lubricating oil supply pipe 31) supplies the lubrication section (see the main shaft 5 or the slidably moving section) of the processing machine 3 with the water insoluble oil homogeneous to the processing oil O1 as the lubricating oil O2; the cleaning liquid supply means 20 supplies the processed work 1 with the water soluble cleaning liquid C; the recovery means 37 recovers the used processing oil O1 and the used cleaning liquid C; the separation means (see the centrifugal separator 45) separates the recovered processing oil O1 and cleaning liquid C into the processing oil O1 and the cleaning liquid C; the first circulation means (see the first circulation channel 57) circulates the separated processing oil O1 to the processing oil supply means 26; and the second circulation means (see the second circulation channel 59) circulates the separated cleaning liquid C to the cleaning liquid supply means 20.

As discussed above, since the water insoluble oil homogeneous to the processing oil O1 used for the mist-lubrication of the processing site on the work 1 is used as the lubricating oil O2 for the lubrication section of the processing machine 3, therefore even if the lubricating oil O2 were mixed into the processing oil O1, the processing oil O1 could be recovered and reused because of the homogeneous properties of both oils.

Further, it is ensured that the water soluble cleaning liquid C and the water insoluble processing oil O1 are separated from each other by using the difference in specific gravity therebetween and made available for reuse.

Therefore, the amount of waste can be reduced and at the same time, the cost reduction can be expected.

In addition, said processing machine 3 may be equipped with the hydraulic actuator 8 which is operated by using the water insoluble oil homogeneous to the processing oil O1 as the hydraulic operating oil O3.

According to this configuration, since the hydraulic operating oil O3 for operating the hydraulic actuator 8 is determined to use the water insoluble oil homogeneous to the processing oil O1, therefore the processing oil O1 could be recovered and thus reused even if the hydraulic operating oil O3 were mixed into the processing oil O1, because of the homogeneous properties of both oils.

In addition, the processing apparatus of the present invention may further comprises the reservoir means (see the automatic oil supply unit 33) for storing the water insoluble oil, and the distribution/supply means (see the distributing sub tank 29, 32) for distributing and supplying the water insoluble oil from said reservoir means to the supply section of the processing oil supply means 26 and to the supply section of the lubricating oil supply means (see the lubricating oil supply pipe 31).

According to this configuration, since the water insoluble oil can be distributed and supplied from the single reservoir means (see the automatic oil supply unit 33) to respective supply sections of the processing oil supply means 26 and the lubricating oil supply means (see the lubricating oil supply pipe 31), therefore the apparatus can be made simple.

In addition, said recovery means 37 may comprise the recovery vessel (see the recovery tank 36) for recovering the used processing oil O1 and the used cleaning liquid C, said separation means may comprise the centrifugal separator 45, and the detection means (see the float sensor) is installed in said recovery vessel (see the recovery tank 36) for detecting the quantity of the processing oil O1 therein, so that said centrifugal separator 45 may be actuated only when an output from said detection means (see the float sensor 51) indicates that a quantity of the processing oil O1 in the recovery vessel has reached the predetermined level.

According to this configuration, since the detection means (see the float sensor 51) detects that the processing oil O1 contained in the recovery vessel (see the recovery tank 36) has reached the predetermined level of quantity, and based on the detected result of the detection means (see the float sensor 51), the centrifugal separator 45 may be actuated only when the need arises, therefore it can help save the power.

In addition, the chip removing means (see the chip separator 40) for removing the chips mixed in the used processing oil O1 and the used cleaning liquid C may be farther provided upstream to said recovery vessel (see the recovery tank 36).

According to this configuration, since the chip removing means (see the chip separator 40) removes the chips at an upstream side of the recovery vessel (see the recovery tank 36), therefore the separating operation in the recovery vessel (see the recovery tank 36) based on the difference in specific gravity can be performed stably.

Alternatively, the processing apparatus of the present invention may comprise a plurality of said processing machines 3, where the cleaning liquid supply means 20 may comprise: the single cleaning liquid reservoir means (see the cleaning liquid tank 17) for storing the recovered cleaning liquid C; the reservoir type intermittent discharge means (see the pool tank 13) which is disposed above a processing stations ST1, ST2 of each processing machine 3 to store the cleaning liquid C and to intermittently supply the cleaning liquid C to the work 1; and the delivery means (see the pump means 18) for supplying the cleaning liquid C from said single cleaning liquid reservoir means (see the cleaning liquid tank 17) to said reservoir type intermittent discharge means (see the pool tank 13).

According to this configuration, since the cleaning liquid C can be supplied almost always from the single cleaning liquid reservoir means (see the cleaning liquid tank 17) to the reservoir type intermittent discharge means (see tie pool tank 13) by the delivery means (see the pump 18), the delivery means (see the pump 18) cam be made to be of small capacity.

Further, since the reservoir type intermittent discharge means (see the pool tank 13) disposed above each of the processing stations ST1, ST2 allows the cleaning liquid C to flow down in dependence on its potential energy, therefore the power saving can be achieved and at the same time, a sufficient quantity of intermittent discharge volume can be secured, which is effective in cooling and cleaning the work 1 as well as removing the chips therefrom.

In addition, said cleaning liquid reservoir means (see the cleaning liquid tank 17) may comprise the concentration detecting means (see the concentration sensor 25) for detecting the concentration of the water soluble cleaning liquid C and the concentration adjusting means (see the electromagnetic valves 21, 23) for adjusting the concentration of the cleaning liquid C to fall within the predetermined range based on the output from the concentration detecting means (see the concentration sensor 25).

According to the above configuration, since the concentration of the cleaning liquid C is adjusted to fall within the predetermined range by the concentration adjusting means (see the electromagnetic valves 21, 23), therefore the cleaning capacity provided by the cleaning liquid C can be maintained in an expected level and at the same time, an improved separation property by the separation means (see the specific gravity based separation function by the centrifugal separator 45 and the recovery tank 36) during separating operation can be established without any trouble.

On the other hand, the operating method of the processing apparatus of the illustrated embodiment is defined as an operating method of such a processing apparatus comprising the processing machine 3 equipped with the tool 2 for processing the work 1, and the processing oil supply means 26 for supplying the processing site on the work 1 with the water insoluble oil in the form of mist as the processing oil O1, in which the used processing oil O1 is recovered and supplied to said processing oil supply means 26, said method characterized in comprising the steps of: the lubricating oil supply step for supplying the water insoluble oil homogeneous to the processing oil O1 to the lubrication section of the processing machine 3 as the lubricating oil O2; the cleaning liquid supply step for supplying the water soluble cleaning liquid C to the processed work 1; the recovery step for recovering the used processing oil O1 and the used cleaning liquid C; the separation step for separating the recovered processing oil O1 and cleaning liquid C into the processing oil O1 and the cleaning liquid C; the first circulation step for circulating the separated processing oil O1 to the processing oil supply means 26; and the second circulation step for circulating the separated cleaning liquid C to the cleaning liquid supply section (see the cleaning liquid supply means 20).

According to this configuration, when the work 1 is processed by the tool 2, the processing oil supply means 26 supplies the water insoluble oil in the form of mist to the processing site on the work 1 as the processing oil O1 so as to provide the mist-lubrication; in the lubricating oil supply step, the water insoluble oil homogeneous to the processing oil O1 is supplied to the lubrication section of the processing machine 3 as the lubricating oil O2; in the cleaning liquid supply step, the water soluble cleaning liquid C is supplied to the processed work 1 so as to cool and dean the work 1; in the recovery step, the used processing oil O1 and the used cleaning liquid C are recovered; in the separation step, the recovered processing oil O1 and cleaning liquid C are separated into the processing oil O1 and the cleaning liquid C; in the first circulation step, the separated processing oil O1 is circulated to the processing oil supply means 26; and in the second circulation step, the separated cleaning liquid C is circulated to the cleaning liquid supply section (see the cleaning liquid supply means 20).

It is to be noted that the above-described first circulation step and the second circulation step may be carried out simultaneously or may be carried out separately.

Since in the above method, the water insoluble oil homogeneous to the processing oil O1 used for the mist-lubrication of the processing site on the work 1 is used as the lubricating oil O2 for the lubrication section of the processing machine 3, therefore even if the lubricating oil O2 were mixed into the processing oil O1, the processing oil could be recovered and reused because of the homogeneous properties of both oils.

Further, it is ensured that the water soluble cleaning liquid C and the water insoluble processing oil O1 are separated from each other by using the difference in specific gravity therebetween and accordingly made available for reuse.

As a result, the amount of waste can be reduced ant at the same time, the cost reduction can be expected.

In addition, said processing machine 3 may be equipped with the hydraulic actuator 8, which is operated by using the water insoluble oil homogeneous to the processing oil O1 as the hydraulic operating oil O3.

According to this configuration, since the hydraulic operating oil O3 for operating the hydraulic actuator 8 is the water insoluble oil homogeneous to the processing oil O1, therefore even if the hydraulic operating oil O3 were mixed in the processing oil O1, the processing oil O1 could be recovered and reused because of the homogeneous properties of both oils.

In addition, said water insoluble oil may be once stored in the reservoir means (see the automatic oil supply unit 33), and from said reservoir means, the water insoluble oil is distributed and supplied to the supply section of the processing oil supply means and the supply section for the lubricating oil (specifically, to the base of the lubricating oil supply pipe 31).

According to this configuration, since the water insoluble oil can be distributed and supplied from the single reservoir means (see the automatic oil supply unit 33) to both the supply sections of the processing oil supply means 26 and the supply section for the lubricating oil, therefore the apparatus can be made simple.

In addition, in said recovery step, the used processing oil O1 as well as the used cleaning liquid C may be recovered into the recovery vessel (see the recovery tank 36), and in said separation step, the centrifugal separator 45 may be used to centrifugally separate the recovered mixture into the processing oil O1 and the cleaning liquid C, wherein the quantity of the processing oil O1 contained in said recovery vessel (see the recovery tank 36) may be detected by the detection means (see the float sensor 51), and the centrifugal separator 45 may be actuated only when the output from the detection means indicates that the quantity of the processing oil O1 has reached the predetermined level.

According to the above configuration, since the detection means (see the float sensor 51) detects that the quantity of the processing oil O1 contained in the recovery vessel (see the recovery tank 36) has reached the predetermined level, and based on the detected result of said detection means, the centrifugal separator 45 is actuated only when the need arises, therefore the power saving can be accomplished.

Alternatively, in the processing apparatus of the present invention, a plurality of said processing machines 3 may be provided, and also the reservoir type intermittent discharge means (see the pool tank 13) may be provide, which stores the cleaning liquid C above a processing station ST1, ST2 of each processing machine 3 to intermittently supply the cleaning liquid C to the work 1, wherein in said cleaning liquid supply step, the cleaning liquid C, which has been separated and thus recovered into the single cleaning liquid reservoir means (see the cleaning liquid tank 17) and delivered in advance from said single cleaning liquid reservoir means (see the cleaning liquid tank 17) to the reservoir type intermittent discharge means (see the pool tank 13) to be stored therein by the delivery means (see the pump 18), may in turn be supplied to the processed work 1.

According to this configuration, since the cleaning liquid C can be supplied almost always from the single cleaning liquid reservoir means (see the cleaning liquid tank 17) to the reservoir type intermittent discharge means (see the pool tank 13) by the delivery means (see the pump 18), consequently the delivery means (see the pump 18) can be made to be of small capacity.

Further, since the reservoir type intermittent discharge means (see the pool tank 13) disposed above each of the processing stations ST1, ST2 allows the stored cleaning liquid C to flow down in dependence on its potential energy, therefore the power saving can be achieved and at the same time, a sufficient quantity of intermittent discharge volume can be secured, which is effective in cooling and cleaning the work 1 as well as removing the chips therefrom.

In addition, the concentration of the water soluble cleaning liquid C may be detected by the concentration detecting means (see the concentration sensor 25) installed in said cleaning liquid reservoir means (see the cleaning liquid tank 17), and the concentration of the cleaning liquid C may be adjusted based on the output from said concentration detecting means (see the concentration sensor 25) so as to fall within the predetermined range.

According to this configuration, since the concentration of the cleaning liquid C is adjusted based on the output from said concentration detecting means (see the concentration sensor 25), therefore the cleaning capacity provided by the cleaning liquid C can be maintained in an expected level and at the same time, an improved separating performance in both the specific gravity based separation and centrifugal separation can be established without any trouble.

Figure 6:
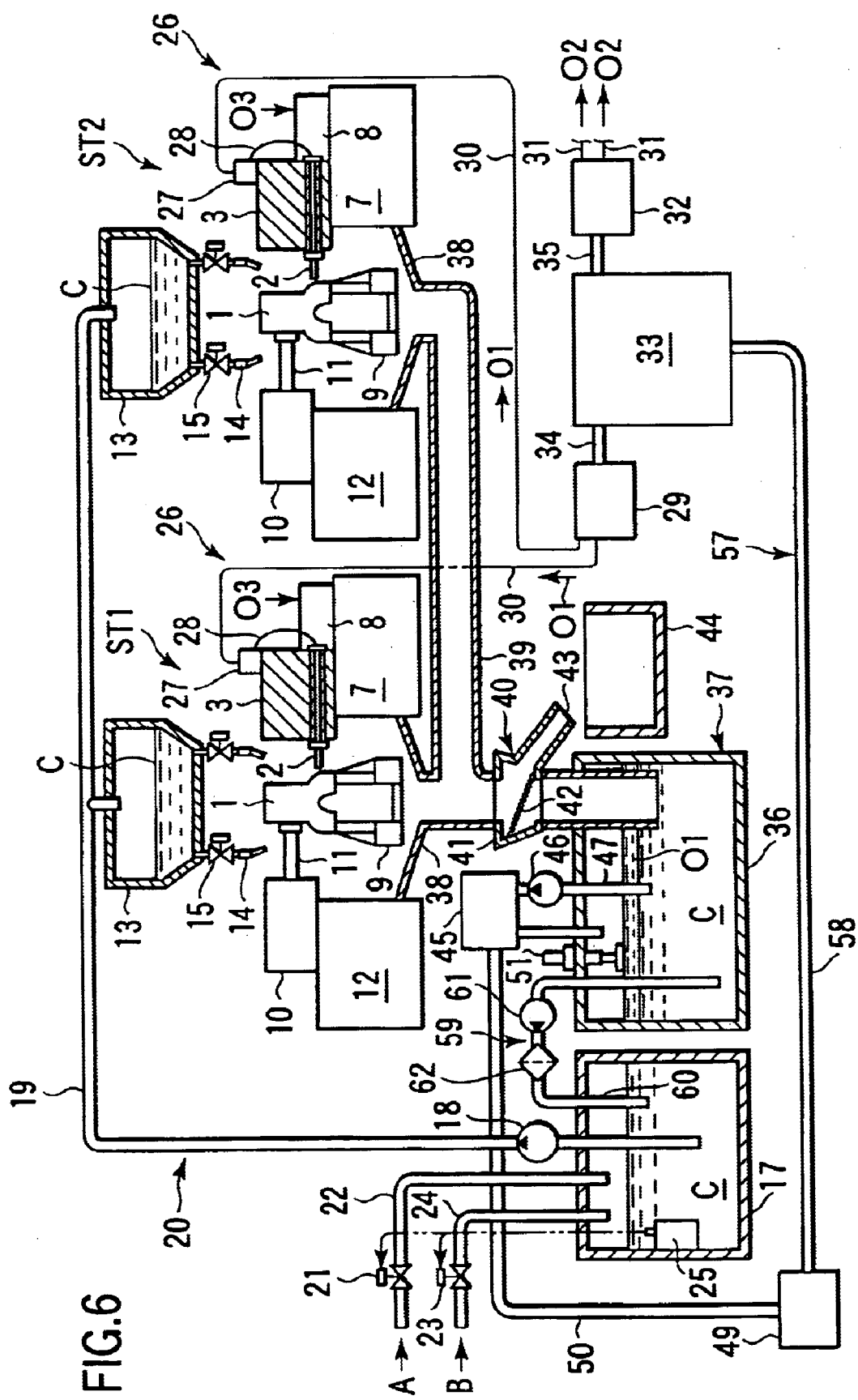
FIG. 6 is a system diagram illustrating another embodiment of a processing apparatus according to the present invention.

FIG. 6 shows an alternative embodiment of the processing apparatus and the operating method of said processing apparatus according to the present invention, in which a net 42 installed in a chip separator 40 is arranged to be inclined down toward a discharge port 43.

With such configuration, the chips separated out onto the net 42 can be smoothly discharged to the discharge port 43. It is to be noted that since also in this embodiment as shown in FIG. 6, the configurations of other components, the operation and the effect are similar to those in the previous embodiments, therefore in this FIG. 6, like components are designated with the same reference numerals and symbols as used in the drawings as referred previously, and accordingly the detailed explanation thereof is omitted.

Figure 7:
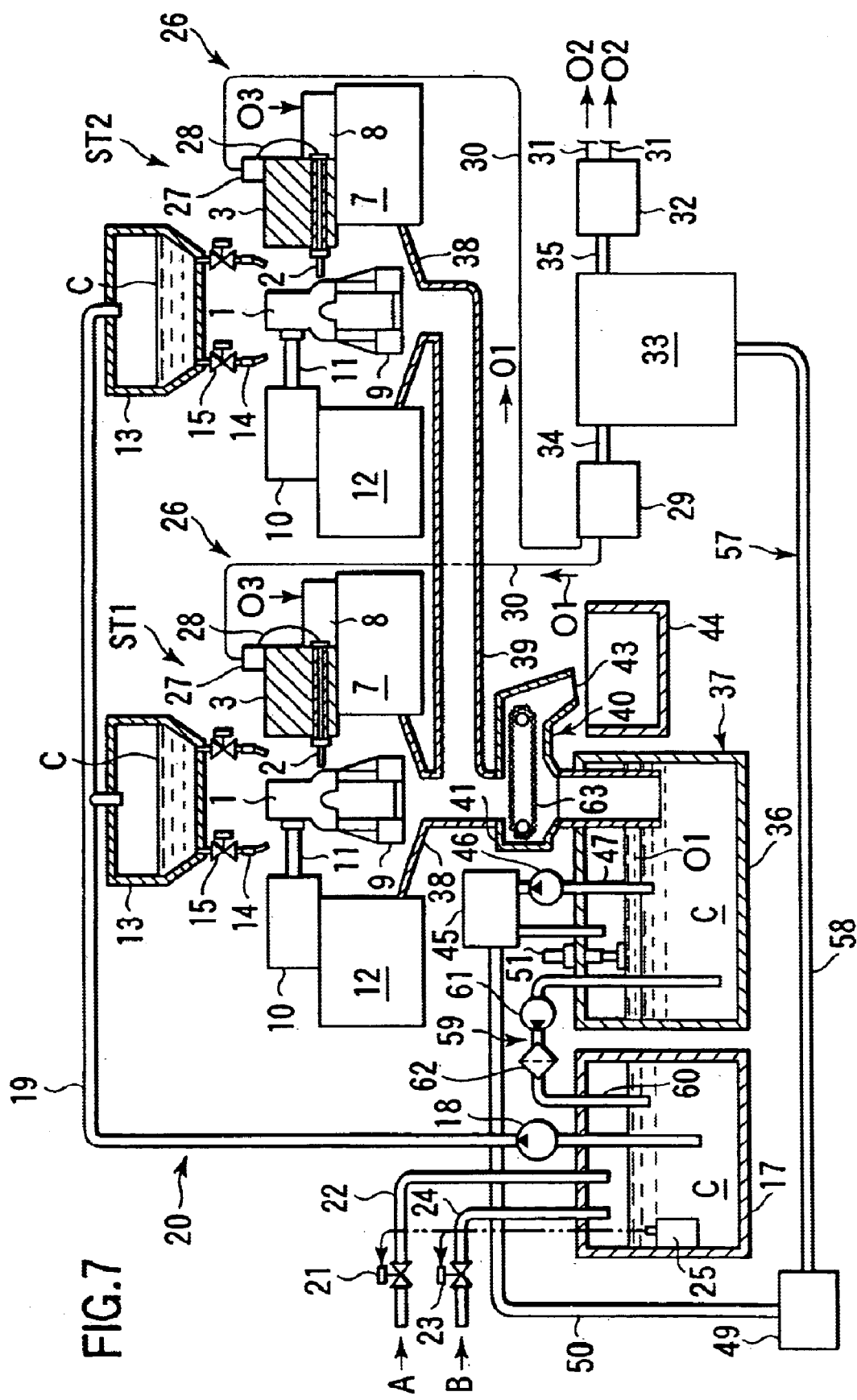
FIG. 7 is a system diagram illustrating yet another embodiment of a processing apparatus according to the present invention.

FIG. 7 shows still another embodiment of the processing apparatus and the operating method of said apparatus according to the present invention, in which a mesh conveyer 63 having an endless net is disposed in the inside of the casing 41 of the chip separator 40.

According to the above configuration, with the aid of driving of the mesh conveyer 63, the chips separated out by the net can be discharged to the discharge port 43 more smoothly still in a sure manner. It is to be noted that since also in this embodiment as shown in FIG. 7, the configurations of other components, the operation and the effect are similar to those in the previous embodiment, therefore in this FIG. 7, like components are designated with the same reference numerals and symbols as used in the drawings as referred previously, and accordingly the detailed explanation thereof is omitted.

Figure 8:
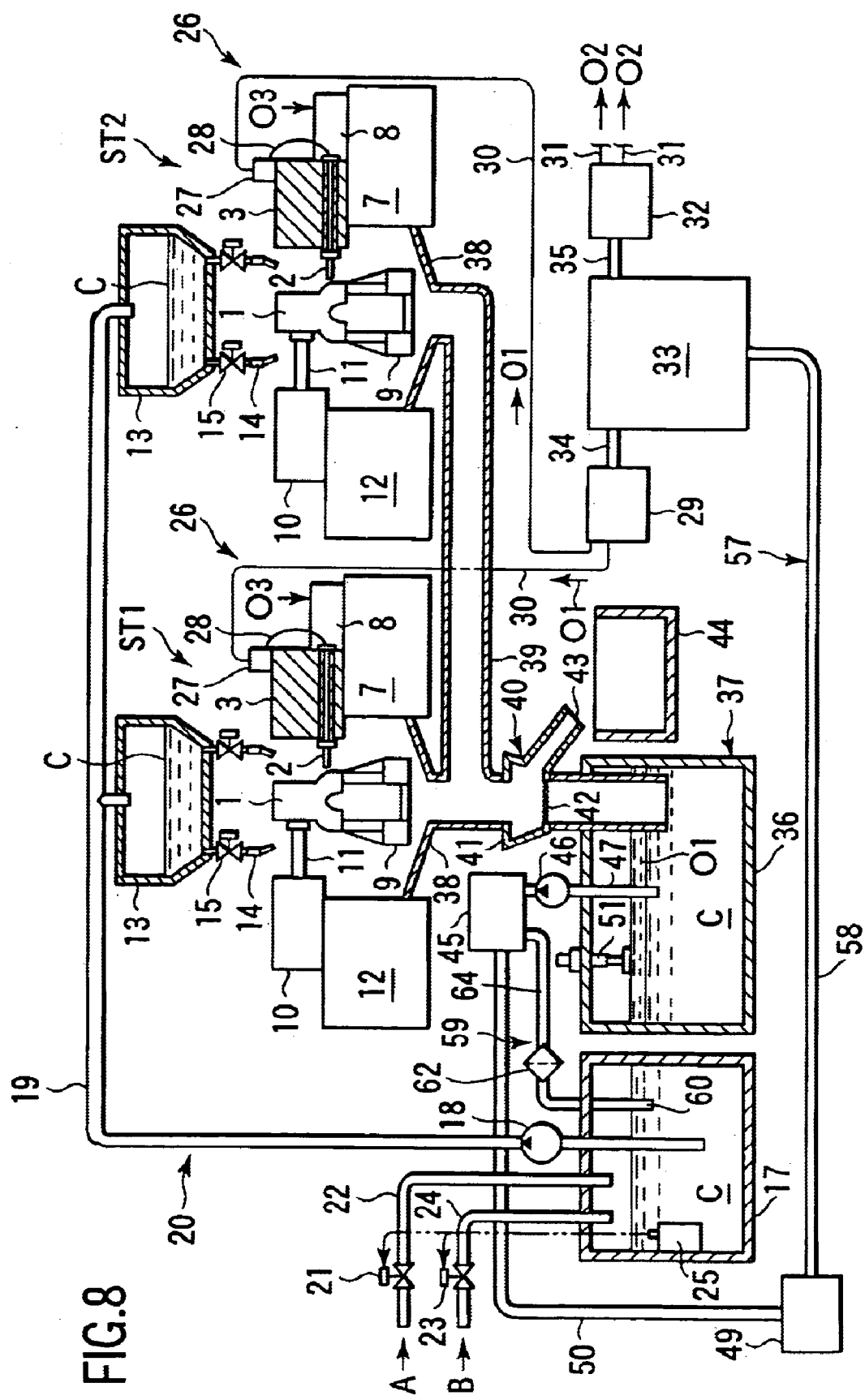
FIG. 8 is a system diagram illustrating still another embodiment of a processing apparatus according to the present invention.

FIG. 8 shows still another embodiment of the processing apparatus and the operating method of said apparatus according to the present invention, in which the apparatus is provided with a return pipe 64 for establishing a communication between a discharge port of a cleaning liquid separated out by a centrifugal separator 45 and the cleaning liquid tank 17, said return pipe 64 including a filter 62 interposed therein, thus constructing a second circulation channel 59.

With such configuration, the processing apparatus can be simplified. It is to be noted that since also in this embodiment as shown in FIG. 8, the configurations of other components, the operation and the effect are similar to those in the previous embodiment, therefore in this FIG. 8, like components are designated with the same reference numerals and symbols as used in the drawings as referred previously, and accordingly the detailed explanation thereof is omitted.

In associating those components in the configuration according to the present invention with specific components in the above embodiments, the lubricating oil supply means of the present invention is corresponding to the lubricating oil supply pipe 31 in the embodiments, and the following description will be given in the similar manner, in which:

the separation means is corresponding to the specific gravity based separating function in the recovery tank 36 and the centrifugal separator 45;

the first circulation means is corresponding to the first circulation channel 57;

the second circulation means is corresponding to the second circulation channel 59;

the reservoir means is corresponding to the automatic supply unit 33;

the distribution/supply means is corresponding to a distributing sub tank, 29, 32;

the recovery vessel is corresponding to the recovery tank 36;

the detection means is corresponding to the float sensor 51;

the chip removing means is corresponding to the chip separator 40;

the cleaning liquid reservoir means is corresponding to the cleaning liquid tank 17;

the reservoir type intermittent discharge means is corresponding to the pool tank 13;

the delivery means is corresponding to the pump 18;

the concentration detecting means is corresponding to the concentration sensor 25; and the concentration control means is corresponding to the electromagnetic valve 21, 23, but the present invention is not limited to the configurations designated in the embodiments as described above.

EFFECT OF THE INVENTION

According to the present invention, since a water insoluble oil homogeneous to a water insoluble oil (a processing oil) used for the mist-lubrication of the processing site on the work is used as a lubricating oil for the lubrication section of the processing machine, while a cleaning liquid supplied for cleaning of the work, after having been processed, is designated as a water soluble liquid, wherein the used processing oil and the used cleaning liquid are recovered and then separated from each other, and the separated processing oil and the separated cleaning liquid are circulated to respective supply sections, therefore even if the lubricating oil is mixed into the processing oil, the processing oil can be recovered and reused because of the homogeneous properties of both oils, thereby facilitating the reduction of the amount of waste as well as the cost reduction.

What is claimed is:

1. A processing apparatus comprising:

a processing machine equipped with a tool for processing a work; and a processing oil supply means for supplying a water insoluble oil in a form of mist to a processing site on the work as a processing oil, wherein said processing oil supply means includes a quantity of said water insoluble oil;

a lubricating oil supply means for supplying a water insoluble oil having the same chemical composition as the processing oil to a lubricating section of the processing machine as a lubricating oil, wherein said lubricating oil supply means includes a supply of said water insoluble oil;

a cleaning liquid supply means for supplying a water soluble cleaning liquid to the work after having been processed;

a recovery means for recovering a used processing oil, a used lubricating oil, and a used cleaning liquid from the processing apparatus;

a separation means for separating the recovered processing oil, the recovered lubricating oil, and the recovered cleaning liquid into a separated water insoluble oil and a separated cleaning liquid;

a first circulation means for circulating the separated water insoluble oil into at least the processing oil supply means among the processing oil supply means and the lubricating oil supply means; and a second circulation means for circulating the separated cleaning liquid into the cleaning liquid supply means.

2. A processing apparatus in accordance with claim 1, in which said processing machine is equipped with a hydraulic actuator which is operated by using a water insoluble oil having the same chemical composition as the water insoluble oil forming the processing oil as a hydraulic operating oil.

3. A processing apparatus in accordance with claim 1, further comprising:

a reservoir means for storing the water insoluble oil; and a distribution/supply means for distributing and supplying the water insoluble oil from said reservoir means to a supply section of the processing oil supply means and a supply section of the lubricating oil supply means.

4. A processing apparatus in accordance with claim 1, in which:

said recovery means comprises a recovery tank for recovering the used processing oil, the used lubricating oil and the used cleaning liquid; and said separation means comprises a centrifugal separator; wherein a detection means is provided for detecting a quantity of the pressing oil and used lubricating in the recovery tank, so that when an output from said detection means indicates that a quantity of the processing oil reached a predetermined level, said centrifugal separator may be actuated.

5. A processing apparatus in accordance with claim 4, in which a chip removing means for removing chips mixed in the used processing oil, the used lubricating oil and the used cleaning liquid is provided upstream to said recovery tank.

6. A processing apparatus in accordance with claim 1, in which:

a plurality of said processing machines are provided; and said cleaning liquid supply means comprises:

a single cleaning liquid reservoir means for storing the separated cleaning liquid;

a reservoir type intermittent discharge means which is disposed above a processing station of each processing machine to store the separated cleaning liquid and to intermittently supply the separated cleaning liquid to the work; and a delivery means for supplying the separated cleaning liquid from said single cleaning liquid reservoir means to said reservoir type intermittent discharge means.

7. A processing apparatus in accordance with claim 4, in which:

a plurality of said processing machines are provided; and said cleaning liquid supply means comprises:

a single cleaning liquid reservoir means for storing the separated cleaning liquid;

a reservoir type intermittent discharge means which is disposed above a processing station of each processing machine to store the separated cleaning liquid and to intermittently supply the separated cleaning liquid to the work; and a delivery means for supplying the separated cleaning liquid from said single cleaning liquid reservoir means to said reservoir type intermittent discharge means.

8. A processing apparatus in accordance with claim 6, in which said cleaning liquid reservoir means comprises:

a concentration detecting means for detecting a concentration of the separated water soluble cleaning liquid; and a concentration adjusting means for adjusting the concentration of the separated cleaning liquid to fall within a predetermined range based on an output from said concentration detecting means.

9. A processing apparatus in accordance with claim 7, in which said cleaning liquid reservoir means comprises:

a concentration detecting means for detecting a concentration of the separated water soluble cleaning liquid; and a concentration adjusting means for adjusting the concentration of the separated cleaning liquid to fall within a predetermined range based on an output from said concentration detecting means.

\* \* \* \* \*